United States Patent
Cheng et al.

(10) Patent No.: US 11,502,592 B2
(45) Date of Patent: Nov. 15, 2022

(54) ISOLATED CONVERTER WITH CONSTANT VOLTAGE MODE AND CONSTANT CURRENT MODE AND CONTROL METHOD THEREOF

(71) Applicant: ALPHA AND OMEGA SEMICONDUCTOR INTERNATIONAL LP, Sunnyvale, CA (US)

(72) Inventors: Jung-Pei Cheng, Zhubei (TW); Yueh-Ping Yu, Zhubei (TW)

(73) Assignee: ALPHA AND OMEGA SEMICONDUCTOR INTERNATIONAL LP, Sunnyvale, CA (US)

( * ) Notice: Subject to any disclaimer, the term of this patent is extended or adjusted under 35 U.S.C. 154(b) by 195 days.

(21) Appl. No.: 17/118,544

(22) Filed: Dec. 10, 2020

(65) Prior Publication Data

US 2022/0103076 A1 Mar. 31, 2022

(30) Foreign Application Priority Data

Sep. 29, 2020 (CN) ............ 202011057820.6

(51) Int. Cl.
*H02M 1/00* (2006.01)
(52) U.S. Cl.
CPC ............... *H02M 1/0025* (2021.05)

(58) Field of Classification Search
CPC .............. H02M 1/0009; H02M 1/0025
See application file for complete search history.

(56) References Cited

U.S. PATENT DOCUMENTS

| | | | | |
|---|---|---|---|---|
| 9,161,407 | B2* | 10/2015 | Yu | H05B 45/38 |
| 11,387,738 | B2* | 7/2022 | Cheng | H02M 3/33523 |
| 2016/0141966 | A1* | 5/2016 | Huang | H02M 3/33523 |
| | | | | 363/21.15 |
| 2018/0041112 | A1 | 2/2018 | Kameyama | |
| 2020/0112264 | A1 | 4/2020 | Arima et al. | |
| 2021/0257920 | A1* | 8/2021 | Cheng | H02M 3/33523 |

\* cited by examiner

*Primary Examiner* — Kyle J Moody
(74) *Attorney, Agent, or Firm* — Chen-Chi Lin

(57) ABSTRACT

An isolated converter has a constant voltage mode and a constant current mode. The isolated converter includes a transformer, a main switch, a driver, a controller, and an isolator. The controller includes a constant current control unit, a voltage comparator, and a control logic unit. The constant current control unit generates a voltage adjustment signal to adjust the reference voltage or voltage feedback signal according to a current feedback signal for sensing the output current. The control logic unit generates a trigger signal according to the comparison signal of the voltage comparator. The isolator connects the output terminal of the controller and the driver. The input terminal is used to transmit the trigger signal to the input terminal of the driver. The isolated converter can provide excellent constant voltage transient response and stable constant current regulation according to load conditions by improving the controller.

20 Claims, 5 Drawing Sheets

Step 1. The constant current control unit generates a voltage adjustment signal according to the current feedback signal for sensing the output current, the voltage feedback signal is added to the voltage adjustment signal, or the reference voltage and the voltage adjusted signal is subjected to a subtraction operation and then provided to the comparator;

Step 2: The comparator compares the voltage feedback signal with an adjusted reference voltage to generate a comparison signal, or compares an adjusted voltage feedback signal with the reference voltage to generate a comparison signal;

Step 3. The control logic unit generates the trigger signal according to the comparison signal;

Step 4. The trigger signal is transmitted to the driver via the isolator, and is used to drive the main switch to be turned on or off.

FIG. 8

ISOLATED CONVERTER WITH CONSTANT VOLTAGE MODE AND CONSTANT CURRENT MODE AND CONTROL METHOD THEREOF

CROSS-REFERENCE TO RELATED APPLICATIONS

This application claims the priority benefit of China patent application number 202011057820.6 filed on Sep. 29, 2020. The entire disclosure made in the China patent application number 202011057820.6 is hereby incorporated by reference.

FIELD OF THE INVENTION

This invention relates generally to converters. More particularly, the present invention related to an isolated converter having a constant voltage mode and a constant current mode and a method to control the isolated converter.

BACKGROUND OF THE INVENTION

For AC-DC conversion, the secondary-side regulation scheme with constant on-time control is an advanced topology for precise constant voltage and constant current control. The existing isolated converter structure is shown in FIG. 1. The first end of the primary winding 10a is connected to an input voltage VIN, and the second end is connected to a main switch 12. It is turned on or off under the driving of a driver 11. The first end of the secondary winding 10b is connected to an output voltage Vo through a diode D1, and the second end of the secondary winding 10b is grounded. The controller 14 is located on the secondary side coupled to the secondary winding 10b. At the same time, a voltage feedback signal FB representing the output voltage Vo and a current feedback signal CS representing the output current IO are obtained. The voltage feedback signal FB is compared with the reference voltage $REF_V$ through a first comparator 141, and the current feedback signal CS is compared with the reference voltage $REF_I$ through a second comparator 142. When the voltage feedback signal FB and the current feedback signal CS are both lower than their respective reference voltage, the control logic unit 145 generates a trigger signal TX143, and the trigger signal TX143 is sent to the main driver 11 through the isolator 15 and then the main switch 12 is turned on. However, in applications with inductive loads, the output current Io will lag the output voltage Vo by a certain phase angle, as shown in FIG. 2, which will result in a low-frequency output voltage, and output current oscillation will occur when the system is operating in constant current mode.

SUMMARY OF THE INVENTION

An isolated converter comprises a transformer, a main switch, a driver, a controller, and an isolator. The transformer comprises a primary winding on a primary side and a secondary winding on a secondary side. The controller includes a constant current control unit, a voltage comparator, and a control logic unit.

BRIEF DESCRIPTION OF THE DRAWINGS

FIG. 8 is a flowchart of the control method in examples of the present disclosure.

DETAILED DESCRIPTION OF THE INVENTION

Figure 1:
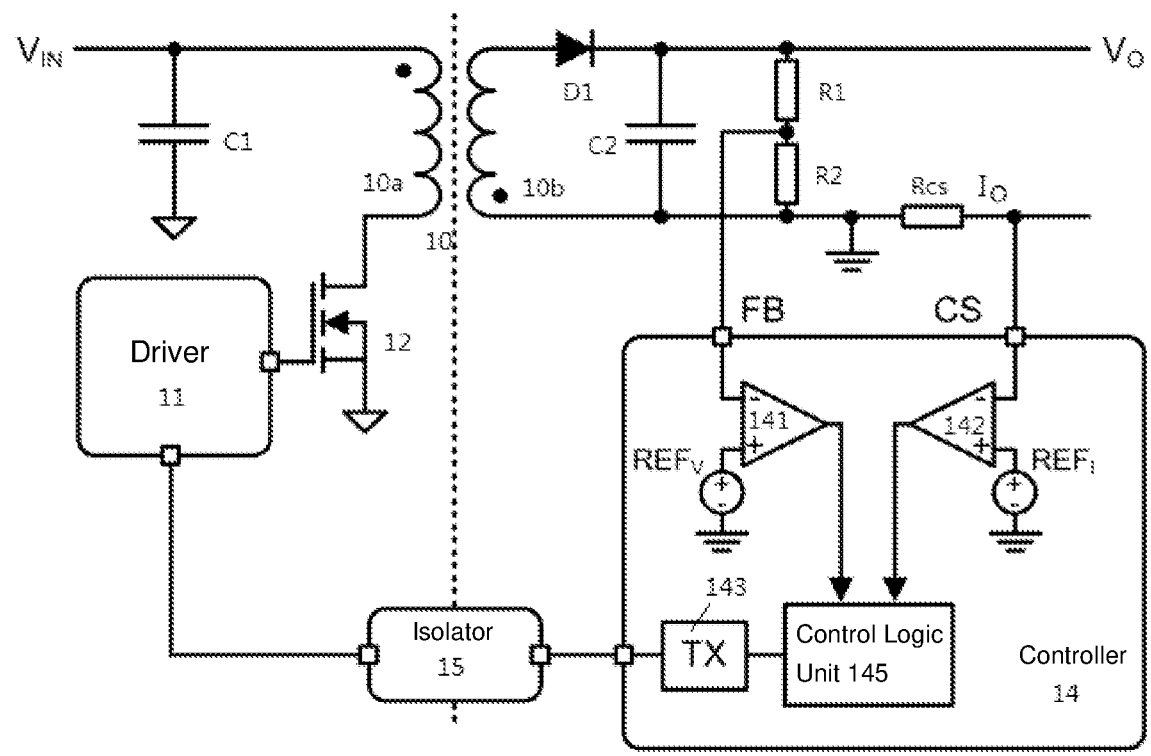
FIG. 1 is a schematic diagram of the structure of a conventional isolated converter.
Figure 2:
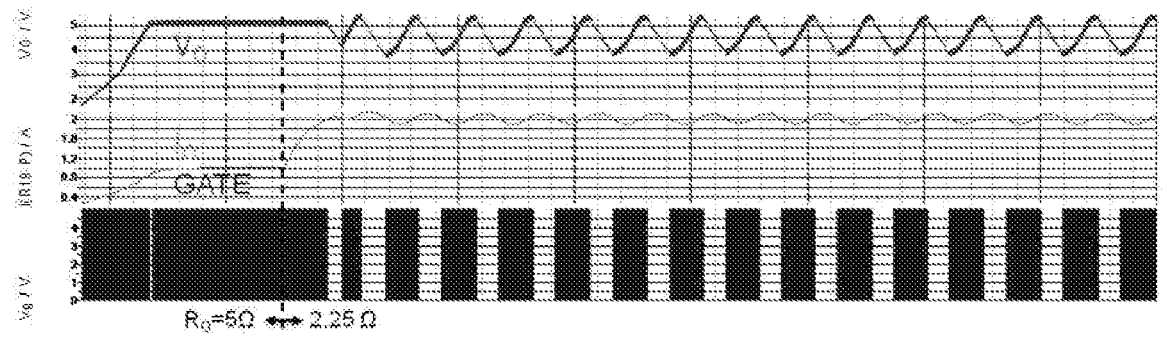
FIG. 2 is a schematic diagram of a waveform of a conventional isolated converter.

Referring now to FIGS. 3-7, the isolated converter with constant voltage mode and constant current mode includes a transformer 10, a main switch 12, a driver 11, a controller 13, and an isolator 15.

The transformer 10 includes a primary winding 10a on a primary side and a secondary winding 10b on a secondary side, the primary winding 10a is connected in series to a main switch 12 between an input voltage VIN, and the ground. The main switch 12 is controllably turned on or off by a driver 11 on the primary side. The first end of the secondary winding 10b is connected to the output voltage Vo through a diode D1, and a load (not shown) is connected between the output voltage Vo and the ground terminal. An input capacitor C1 is connected between the input voltage VIN and the ground, an output capacitor C2 is connected between the output voltage Vo and the ground, and a circuit to sense the output voltage Vo is also connected between the output voltage Vo and the ground. The voltage sensing circuit includes a first resistor R1 and a second resistor R2 connected in series with the first resistor R1. The node where the second resistor R2 is connected to the first resistor R1 leads to a voltage feedback signal FB, and a current detection resistor Rcs connected in series to the load between Vo and the ground terminal is used to sense the output current Io to provide a current feedback signal CS.

The controller 13 includes a constant current control unit 132, a voltage comparator 131, and a control logic unit 135.

The constant current control unit 132, which generates a voltage adjustment signal according to the current feedback signal CS representing the output current Io, and the voltage adjustment signal may be applied to adjust the reference voltage $REF_V$ or the voltage feedback signal FB.

The voltage comparator 131 compares a voltage feedback signal FB representing the output voltage Vo with an adjusted reference voltage, or compares an adjusted voltage feedback signal with the reference voltage $REF_V$, to generate a comparison signal.

The control logic unit 135, connected to the voltage comparator 131, generates a trigger signal TX133 according to the comparison signal.

The isolator 15 is connected to an output terminal of the controller 13 on the secondary side and an input terminal of the driver 11 on the primary side for transmitting the trigger signal TX133 to the input terminal of the driver 11.

Figure 3:
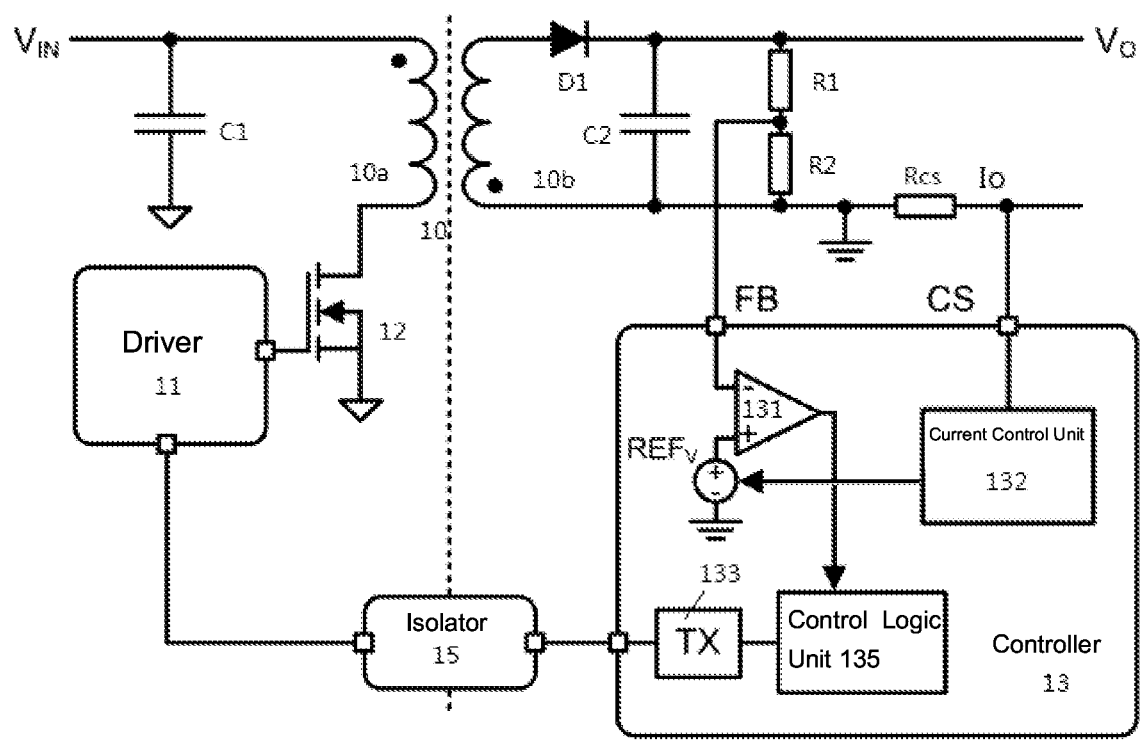
FIG. 3 is a schematic structural diagram of an isolated converter in examples of the present disclosure.
Figure 4:
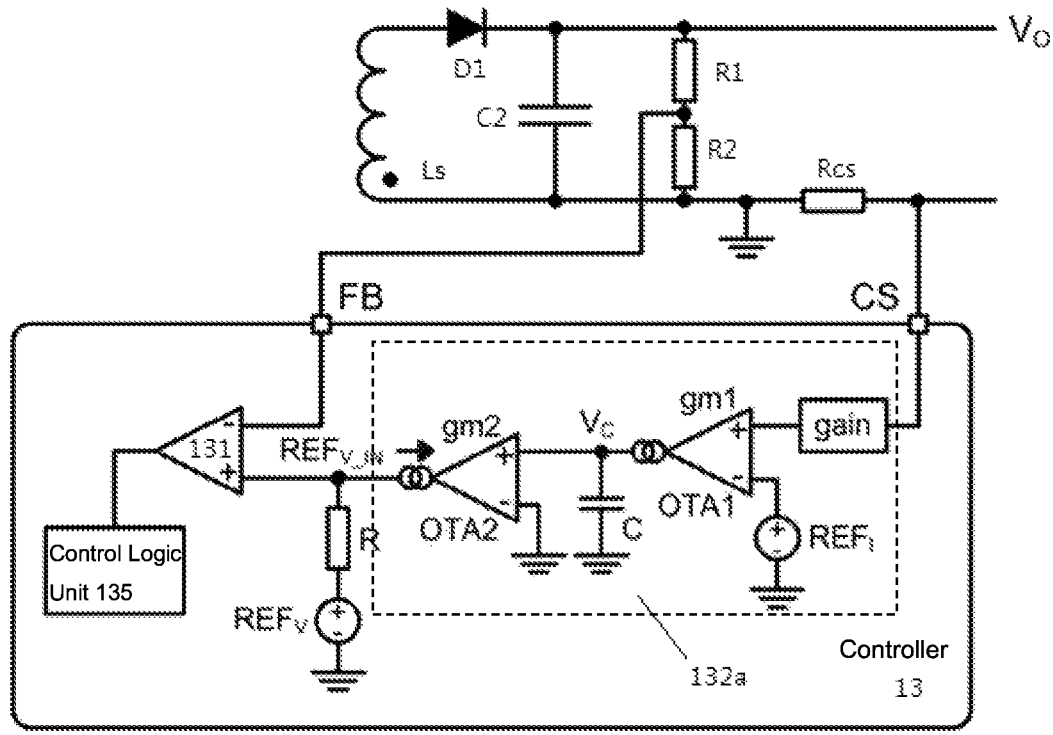
FIG. 4 is a schematic diagram of the connection of the secondary winding in the isolated converter structure in examples of the present disclosure.
Figure 5:
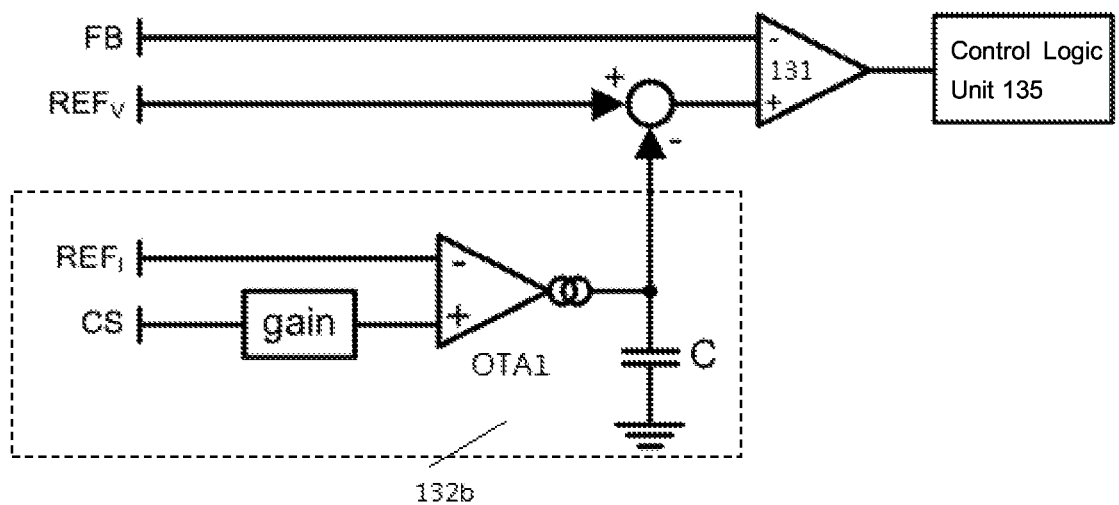
FIG. 5 is a schematic diagram of controller connection of in examples of the present disclosure.
Figure 6:
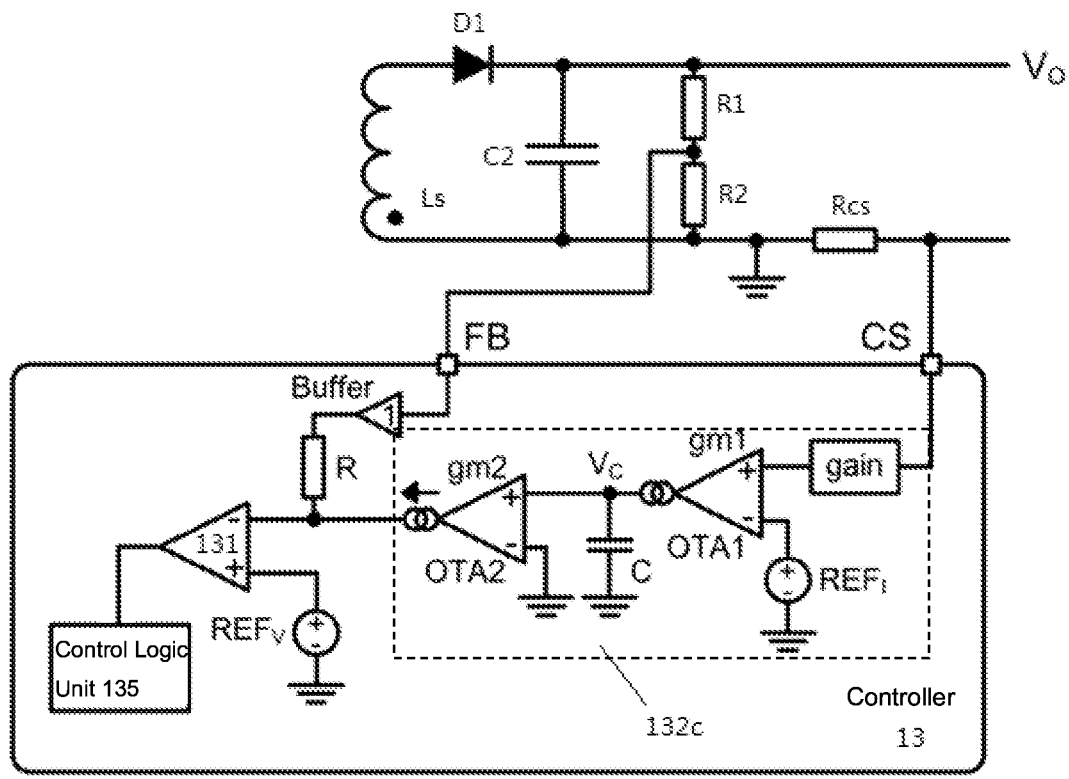
FIG. 6 is a schematic diagram of the connection of the secondary winding in another isolated converter structure in examples of the present disclosure.
Figure 7:
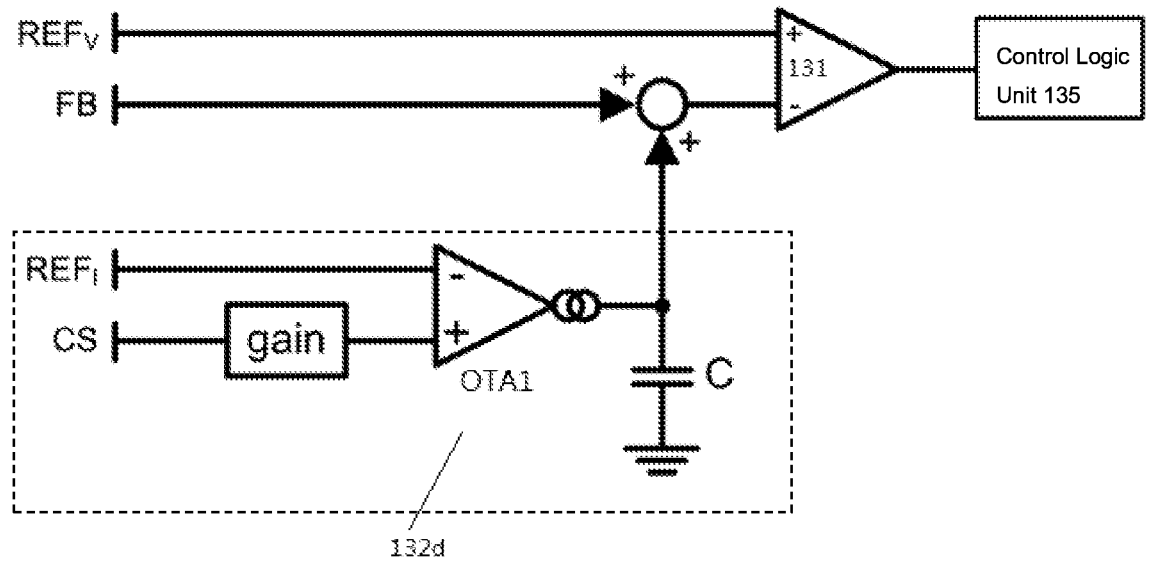
FIG. 7 is a schematic diagram of controller connection in examples of the present disclosure.

When the isolated converter of the present disclosure is in operation, in the examples of FIGS. 3 to 5, the constant current control unit 132 generates a voltage adjustment signal to adjust the reference voltage $REF_V$ according to the current feedback signal representing the output current Io. The voltage feedback signal FB is compared with the adjusted reference voltage by the voltage comparator 131 to generate a comparison signal. In the example of FIG. 6 and FIG. 7, the constant current control unit 132 generates a voltage adjustment signal adjustment according to the current feedback signal representing the output current Io to adjust the voltage feedback signal FB, and the voltage comparator 131 compares the adjusted voltage feedback signal with the reference voltage $REF_V$ to generate a comparison signal; when the voltage adjustment signal is zero, the adjusted reference voltage is the reference voltage $REF_V$ and the adjusted voltage feedback signal is the voltage feedback signal FB. At this time, the controller 13 operates in constant voltage mode, and the control logic unit 135 generates the trigger signal TX133 according to the comparison signal. The trigger signal TX133 is transmitted to the driver 11 through the isolator 15 to drive the main switch 12 to turn on or off, which can provide excellent constant voltage transient response and stable constant current regulation according to load conditions.

As an example of the isolated converter with constant voltage mode and constant current mode of the present disclosure, referring to FIGS. 4 and 6, the constant current control units 132a, 132c may include a first operational amplifier OTA1 and a second operational amplifier OTA2.

The first operational amplifier OTA1 receives the current feedback signal CS and a first current reference voltage REFI to output a first operational amplifier signal, and a first capacitor C is connected between the output terminal of the first operational amplifier OTA1 and the ground terminal. Alternatively, the first capacitor C may be connected between the output terminal and the inverting input of the first operational amplifier (not shown).

The non-inverting input terminal of the second operational amplifier OTA2 is connected to receive the first operational amplifier signal, the inverting input terminal of the second operational amplifier OTA2 is connected to the ground terminal, and the output terminal of the second operational amplifier OTA2 outputs the voltage adjustment signal.

In FIG. 4, the non-inverting input terminal of the second operational amplifier OTA2 is connected to receive the first operational amplified signal Vc, the output terminal of the second operational amplifier OTA2 provides the voltage adjustment signal. The reference voltage $REF_V$ is connected through a resistor R to the non-inverting input terminal of the voltage comparator 131, where the voltage adjustment signal is subtracted from the reference voltage $REF_V$ and then input to the non-inverting input terminal of the voltage comparator 131 for comparison with the voltage feedback signal FB to generate a comparison signal feeding the control logic Unit 135.

In FIG. 6, the non-inverting input terminal of the second operational amplifier OTA2 is connected to receive the first operational amplifier signal Vc, the output terminal of the second operational amplifier OTA2 provides the voltage adjustment signal. The voltage feedback signal FB connects through a buffer and a resistor R in series to the inverting input terminal of the voltage comparator 131, where the voltage adjustment signal and the voltage feedback signal FB are added and then input to the inverting input terminal of the voltage comparator 131 to compare with the reference voltage $REF_V$ to generate a comparison signal feeding the control logic unit 135.

As an example of the isolated converter with constant voltage mode and constant current mode of the present disclosure, referring to FIG. 5 and FIG. 7, the constant current control unit 132b, 132d may include: a first operational amplifier OTA1 receives the current feedback signal CS and the first current reference voltage REFI to output a first operational amplification signal. A first capacitor C is connected between the output terminal and the ground terminal of the first operational amplifier, and the first operational amplification signal is used as the voltage adjustment signal. Alternatively, the first capacitor C may be connected between the output terminal and the inverting input of the first operational amplifier (not shown).

In FIG. 5, a subtractor is connected to the non-inverting input terminal of the voltage comparator 131, and the voltage adjustment signal is subtracted from the reference voltage $REF_V$ and then input to the non-inverting input terminal of the voltage comparator 131 to compare with the voltage feedback signal FB to generate a comparison signal feeding the control logic unit 135.

In FIG. 7, an adder is connected to the inverting input terminal of the voltage comparator 131, and the voltage adjustment signal and the voltage feedback signal FB are added and then input to the inverting input terminal of the voltage comparator 131 to compare with the reference voltage $REF_V$ to generate a comparison signal feeding the control logic unit 135.

As an example of the present disclosure, the above-mentioned first operational amplifier OTA1 and second operational amplifier OTA2 are both transconductance operational amplifiers, gm1 is the transconductance of the first operational amplifier OTA1, and gm2 is the transconductance of the second operational amplifier OTA2.

The isolated converter with constant voltage mode and constant current mode of the present disclosure, referring to FIGS. 4 to 7, the constant current control unit 132a, 132b, 132c, 132d further includes a gain amplifier to amplify the current feedback signal CS before received by the operational amplifier OTA1.

In the isolated converter with constant voltage mode and constant current mode of the present disclosure, the non-inverting input end of the voltage comparator 131 is connected to the reference voltage $REF_V$, and the voltage feedback signal FB is connected through a buffer and a resistor R in series to the inverting input terminal of the voltage comparator 131. The buffer can prevent the voltage feedback signal FB from being affected by the current output of the second operational amplifier OTA2.

The flow chart of FIG. 8 is a control method of an isolated converter having a constant voltage mode and a constant current mode according to the present disclosure, including the following steps:

Step 1. The constant current control unit generates a voltage adjustment signal according to the current feedback signal representing the output current. The voltage adjustment signal is added to the voltage feedback signal representing the output voltage or is subtracted from the reference voltage to provide an adjusted voltage feedback signal or an adjusted reference signal;

Step 2: The comparator compares the voltage feedback signal with the adjusted reference voltage, or the adjusted voltage feedback signal with the reference voltage, to generate a comparison signal;

Step 3: The control logic unit generates a trigger signal according to the comparison signal;

Step 4: The trigger signal is transmitted to the driver via the isolator to drive the main switch to turn on or off.

In Step 1, the constant current control unit compares the current feedback signal representing the output current to a preset first current reference voltage REFI to generate the voltage adjustment signal. In the example of FIG. 4, when the current feedback signal CS is lower than the first current reference voltage REFI, the voltage adjustment signal is zero, the non-inverting input terminal of the voltage comparator 131 is the reference voltage $REF_V$ without adjustment, and the inverting terminal of the voltage comparator 131 is the voltage feedback signal FB, the controller 13 operates in constant voltage mode. When the current feedback signal CS is higher than the first current reference voltage REFI, because the first operational amplification signal Vc increases, the sinking current of the second operational unit OTA2 increases, the reference voltage $REF_V$ in the constant voltage control loop is thus adjusted to achieve constant current regulation according to load conditions.

In the example of FIG. 6, when the current feedback signal CS is lower than the first current reference voltage REFI, the voltage adjustment signal is zero, the inverting input terminal of the voltage comparator 131 is the voltage feedback signal FB without adjustment, and the non-inverting input terminal of the voltage comparator 131 is the reference voltage $REF_V$, the controller 13 operates in constant voltage mode. When the feedback signal CS is higher than the first current reference voltage REFI, as the first operational amplification signal increases, the voltage on the capacitor C increases and is superimposed on the voltage feedback signal FB, the output voltage Vo is thus adjusted to achieve constant current regulation according to the load conditions.

Those of ordinary skill in the art may recognize that modifications of the embodiments disclosed herein are possible. For example, a total number of components of the isolated converter may vary. Other modifications may occur to those of ordinary skill in this art, and all such modifications are deemed to fall within the purview of the present invention, as defined by the claims.

The invention claimed is:

1. An isolated converter with a constant voltage mode and a constant current mode, the isolated converter comprising:
   a transformer comprising
      a primary winding on a primary side; and
      a secondary winding on a secondary side;
   a main switch on the primary side, the main switch being connecting in series with the primary winding;
   a driver on the primary side, the main switch being controllably turned on or off by the driver to control a current flowing through the primary winding;
   a controller on the secondary side, the controller comprising:
      a constant current control unit generating a voltage adjustment signal according to a current feedback signal representing an output current, the voltage adjustment signal being applied to adjust a reference voltage or a voltage feedback signal representing an output voltage, to generate an adjusted reference voltage or an adjusted voltage feedback signal;
      a voltage comparator comparing the voltage feedback signal with the adjusted reference voltage, or the adjusted voltage feedback signal with the reference voltage, to generate a comparison signal; and
      a control logic unit generating a trigger signal according to the comparison signal; and
   an isolator transmitting the trigger signal from the secondary side to the driver on the primary side.

2. The isolated converter of claim 1, wherein the constant current control unit comprises a first operational amplifier receiving the current feedback signal and a first current reference voltage to produce a first operational amplifier signal as the voltage adjustment signal at an output terminal of the first operational amplifier.

3. The isolated converter of claim 2, wherein the constant current control unit further comprises a first capacitor connecting between the output terminal of the first operational amplifier and a ground terminal.

4. The isolated converter of claim 2, wherein the constant current control unit further comprises a gain amplifier to amplify the current feedback signal before received by the first operational amplifier.

5. The isolated converter of claim 2, wherein when the current feedback signal is lower than the first current reference voltage, the voltage adjustment signal is zero, the controller operates in the constant voltage mode; and
   wherein when the current feedback signal is higher than the first current reference voltage, the constant current control unit outputs the voltage adjustment signal for constant current adjustment.

6. The isolated converter of claim 2, wherein the first operational amplifier is a transconductance operational amplifier.

7. The isolated converter of claim 2, wherein the first operational amplifier receives the current feedback signal at a non-inverting input terminal and the first current reference voltage at an inverting input terminal.

8. The isolated converter of claim 1, wherein the constant current control unit comprises:
   a first operational amplifier receiving the current feedback signal and a first current reference voltage to produce a first operational amplified signal at an output terminal of the first operational amplifier; and
   a second operational amplifier receiving the first operational amplifier signal to produce the voltage adjustment signal.

9. The isolated converter of claim 8, wherein the constant current control unit further comprises a first capacitor connecting between the output terminal of the first operational amplifier and a ground terminal.

10. The isolated converter of claim 8, wherein the constant current control unit further comprises a gain amplifier to amplify the current feedback signal before received by the first operational amplifier.

11. The isolated converter of claim 8, wherein when the current feedback signal is lower than the first current reference voltage, the voltage adjustment signal is zero, the controller operates in the constant voltage mode; and
   when the current feedback signal is higher than the first current reference voltage, the constant current control unit outputs the voltage adjustment signal for constant current adjustment.

12. The isolated converter of claim 8, wherein the first operational amplifier is a transconductance operational amplifier, and the second operational amplifier is another transconductance operational amplifier.

13. The isolated converter of claim 8, wherein the first operational amplifier receives the current feedback signal at a non-inverting input terminal and the first current reference voltage at an inverting input terminal.

14. The isolated converter of claim 13, wherein the second operational amplifier comprises a non-inverting input terminal receiving the first operational amplifier and an inverting input terminal connecting to ground.

15. The isolated converter of claim 1, wherein the controller further comprises an adder connecting to an inverting input terminal of the voltage comparator for adding the voltage feedback signal and the voltage adjustment signal to generate the adjusted voltage feedback signal received at the inverting input terminal of the voltage comparator.

16. The isolated converter of claim 1, wherein the controller further comprises a subtractor connected to a non-inverting input terminal of the voltage comparator for subtracting the voltage adjustment signal from the reference voltage to generate the adjusted reference voltage received at the non-inverting input terminal of the voltage comparator.

17. The isolated converter of claim 1, wherein a non-inverting input terminal of the voltage comparator connects to the reference voltage, and an inverting input terminal of the voltage comparator connects to the voltage feedback signal through a buffer and a resistor connected in series.

18. The isolated converter of claim 17, wherein an output terminal of the constant current control unit connects to the inverting input terminal of the voltage comparator to provide the voltage adjustment signal to generate the adjusted voltage feedback signal.

19. The isolated converter of claim 1, wherein a non-inverting input terminal of the voltage comparator connects to the voltage feedback signal, and an inverting input terminal of the voltage comparator connects to the reference voltage through a resistor.

20. The isolated converter of claim 19, wherein an output terminal of the constant current control unit connects to the non-inverting input terminal of the voltage comparator to provide the voltage adjustment signal to generate the adjusted voltage feedback signal.

* * * * *